(12) United States Patent
Hecht

(10) Patent No.: US 8,500,374 B2
(45) Date of Patent: Aug. 6, 2013

(54) CUTTING TOOL AND CUTTING INSERT HAVING CLAMPING RECESS THEREFOR

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 106 days.

(21) Appl. No.: 13/348,254

(22) Filed: Jan. 11, 2012

(65) Prior Publication Data

US 2012/0213600 A1   Aug. 23, 2012

(30) Foreign Application Priority Data

Feb. 21, 2011   (IL) .......................................... 211326

(51) Int. Cl.
*B23B 27/16* (2006.01)
*B23C 5/20* (2006.01)

(52) U.S. Cl.
USPC .............................. 407/66; 407/113; 407/102

(58) Field of Classification Search
USPC .............. 407/33, 66, 102–104, 107, 109, 113
IPC .................................... B23B 27/16; B23C 5/20
See application file for complete search history.

(56) References Cited

U.S. PATENT DOCUMENTS

| | | | | |
|---|---|---|---|---|
| 1,664,083 A * | 3/1928 | Miller | .............................. | 407/44 |
| 1,874,536 A * | 8/1932 | Irwin | .............................. | 76/115 |
| 2,500,387 A | 3/1950 | Sheridan | | |
| 3,299,491 A * | 1/1967 | Hall | .................................. | 407/5 |
| 3,374,700 A * | 3/1968 | Mages | ............................ | 83/674 |
| 3,812,547 A * | 5/1974 | Reich | ................................ | 470/80 |
| 3,838,724 A * | 10/1974 | Buchacher et al. | ........... | 144/230 |
| 3,911,543 A * | 10/1975 | Sorice | ............................... | 407/77 |
| 4,360,297 A * | 11/1982 | Weber | ............................ | 407/113 |
| 4,669,924 A * | 6/1987 | Benson | ......................... | 407/113 |
| 5,820,311 A * | 10/1998 | Grun et al. | ..................... | 407/102 |
| 5,924,824 A * | 7/1999 | Satran et al. | ..................... | 407/34 |
| 6,017,172 A * | 1/2000 | Ukegawa et al. | ............. | 407/113 |
| 6,158,928 A * | 12/2000 | Hecht | ............................. | 407/102 |
| 6,409,435 B1 * | 6/2002 | Kocherovsky et al. | ....... | 407/104 |
| 6,499,917 B1 * | 12/2002 | Parker et al. | ..................... | 407/25 |
| 6,733,215 B2 * | 5/2004 | Isaksson | ....................... | 407/114 |
| 6,916,137 B2 * | 7/2005 | Shiraiwa | ....................... | 407/101 |

(Continued)

FOREIGN PATENT DOCUMENTS

| | | |
|---|---|---|
| DE | 4240295 A1 | 6/1993 |
| EP | 0137680 | 4/1985 |

(Continued)

OTHER PUBLICATIONS

Search Report dated May 16, 2012 issued in PCT counterpart application (No. PCT/IL2012/000025).

*Primary Examiner* — Andrea Wellington
*Assistant Examiner* — Sara Addisu
(74) *Attorney, Agent, or Firm* — Womble Carlyle

(57) ABSTRACT

A cutting insert includes opposing first and second major surfaces and two side surfaces extending therebetween, two side abutment surfaces, each located on a respective side surface and a clamping recess which opens out to the second major surface and/or to the insert front surface. The side abutment surfaces converge towards the first major surface and the side surfaces converge in a direction away from an insert front surface which extends between the major surfaces and the side surfaces. The clamping recess does not extend beyond a mid plane, which is located midway between the first and second surfaces.

18 Claims, 2 Drawing Sheets

U.S. PATENT DOCUMENTS

| | | | |
|---|---|---|---|
| 7,252,460 B2 * | 8/2007 | Rieth | 407/113 |
| 7,347,650 B2 * | 3/2008 | Tipu | 407/105 |
| 7,476,063 B2 * | 1/2009 | Wickman et al. | 407/113 |
| 7,510,353 B2 * | 3/2009 | Kramer | 407/113 |
| 8,356,960 B2 * | 1/2013 | Orlov et al. | 407/103 |
| 8,388,272 B2 * | 3/2013 | De Souza Filho et al. | 407/103 |

FOREIGN PATENT DOCUMENTS

| | | | |
|---|---|---|---|
| EP | 0559965 | | 9/1993 |
| JP | 2005262329 A | * | 9/2005 |
| JP | 2008260090 A | * | 10/2008 |
| JP | 2011183491 A | * | 9/2011 |

* cited by examiner

CUTTING TOOL AND CUTTING INSERT HAVING CLAMPING RECESS THEREFOR

FIELD OF THE INVENTION

The subject matter of the present application relates to turning tools, and rotary slotting cutters.

BACKGROUND OF THE INVENTION

Turning tools, having a cutting insert clamped in an insert pocket are disclosed, for example in EP 0559965B1.

SUMMARY OF THE INVENTION

In accordance with the subject matter of the present application there is provided a cutting insert comprising:
 opposing insert front and rear ends,
 opposing first and second major surfaces and two side surfaces extending therebetween,
 two side abutment surfaces, each located on a respective side surface,
 an insert front surface formed at the insert front end and extending between the first and second major surfaces and between the side surfaces, and
 a clamping recess opening out to the second major surface and/or to the insert front surface;
 the side abutment surfaces converging towards the first major surface, the side surfaces converging in a direction away from the insert front surface and the first surface merging with the front surface and the side surfaces at an edge, at least a portion of which comprising a cutting edge,
 wherein
 the clamping recess comprises an insert clamping surface which faces towards the insert front end, and wherein the clamping recess does not extend beyond a mid plane P, which is located midway between the first and second surfaces in a thickness direction of the cutting insert.

In accordance with the subject matter of the present application there is further provided a holder comprising:
 an insert pocket comprising:
  an insert pocket front end and an insert pocket rear end;
  an insert pocket front surface located at the front end of the insert pocket;
  an insert support surface extending from the insert pocket front surface, in a rearward direction, towards the insert pocket rear end;
  two support walls extending from the insert support surface to an insert pocket top surface, in an upward direction, away from the insert support surface, the support walls converging in the upward direction, and in the rearward direction;
  a housing opening out to the insert support surface and to the insert pocket front surface, the housing comprising a housing wall extending downwards from the insert support surface and a housing peripheral surface extending from the housing wall to the insert pocket front surface; and
  a bore opening out to the housing wall, the bore having a longitudinal bore axis B; and
 a clamping member comprising a head with a head clamping surface,
 wherein
 when the clamping member is located in the housing, an exposed clamping surface of the head clamping surface protrudes above the insert support surface.

In accordance with the subject matter of the present application there is still further provided a cutting tool comprising the holder and the cutting insert, securely clamped in the insert pocket of the holder.

In an assembled position of the cutting tool:
 the second major surface abuts the insert support surface;
 each side abutment surface abuts a respective support wall;
 an exposed head portion of the head is accommodated by the clamping recess; and
 the exposed clamping surface of the head clamping surface abuts the insert clamping surface.

It is understood that the above-said is a summary, and that any of the aspects above can further comprise, or be further defined with, any of the features described in connection with any of the other aspects or features described hereinbelow. For example, the following features may be applicable to any of the above aspects of the invention:

The clamping recess can open out to the second major surface and/or to the insert front surface at a non-round opening.

The opening can have a rectangular shape.

In a direction perpendicular to the mid plane P, the insert clamping surface has a length L and the cutting insert has a maximum thickness T; and wherein the length L can be in the range of 10% to 45% of a maximum thickness T of the cutting insert.

The cutting insert can be devoid of through holes.

In a cross sectional front view of the cutting insert, the clamping recess can have an arched shape.

The insert clamping surface can be perpendicular to the second major surface.

The clamping recess can comprise an insert abutment surface located opposite the insert clamping surface.

The insert pocket can be configured only for clamping cutting inserts.

The clamping member can be a screw.

The longitudinal bore axis B can be parallel to the insert support surface.

The housing peripheral surface can comprise a plurality of rail-shaped head support surfaces which extend along its length.

The holder can comprise a washer, located between the head and the housing wall.

The washer can comprise a washer thread and the washer can be threadingly secured to the clamping member.

When the cutting insert is seated in the insert pocket, an insert rear surface of the cutting insert does not contact any portion of the insert pocket.

BRIEF DESCRIPTION OF THE DRAWINGS

For a better understanding of the subject matter of the present application and to show how the same may be carried out in practice, reference will now be made to the accompanying drawings, in which.

DETAILED DESCRIPTION OF THE INVENTION

In the following description, various aspects of the subject matter of the present application will be described. For purposes of explanation, specific configurations and details are set forth in order to provide a thorough understanding of the subject matter of the present application. However, it will also be apparent to one skilled in the art that the subject matter of the present application may be practiced without the specific details presented herein.

Figure 1:
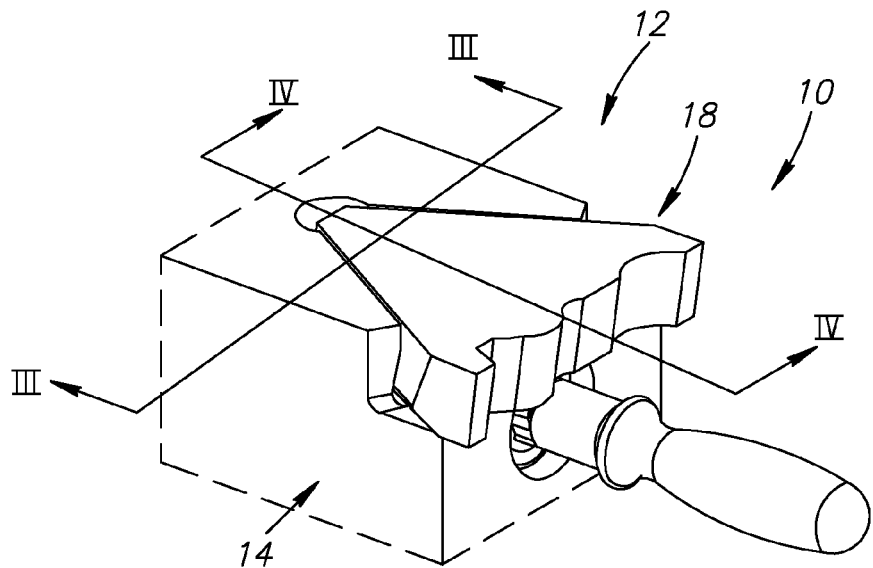
FIG. 1 is an isometric view of a cutting portion of a cutting tool with a cutting insert clamped therein.
Figure 2:
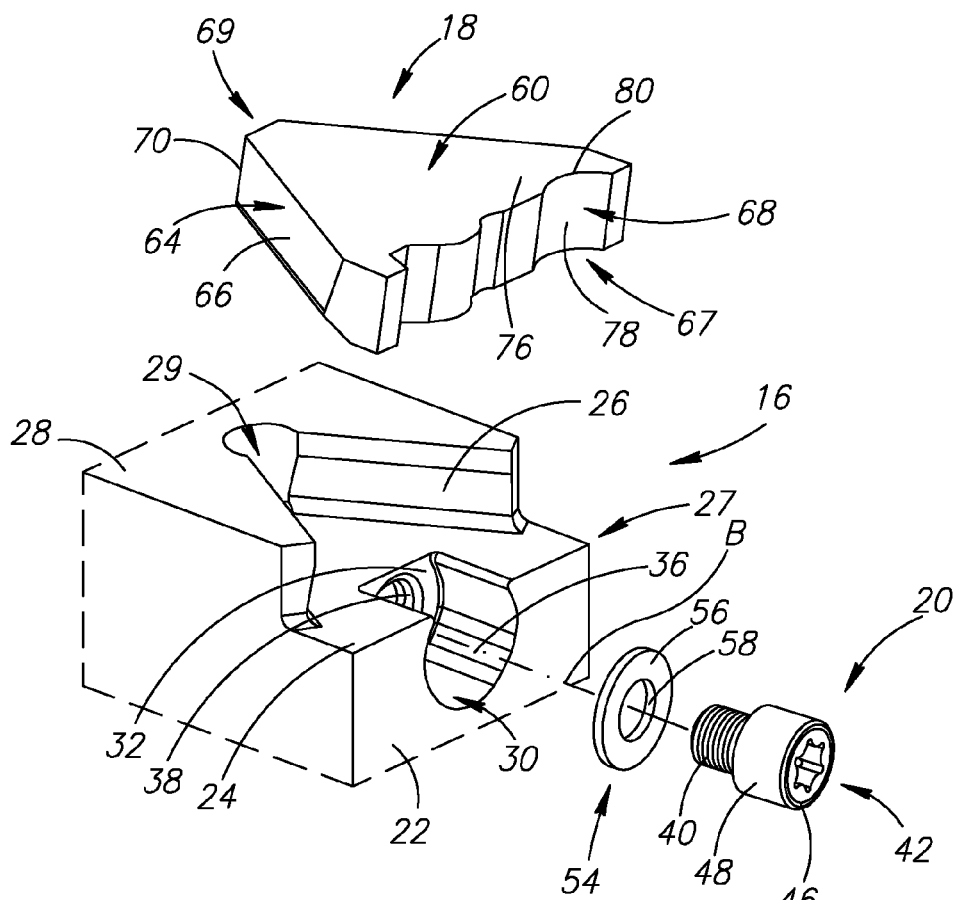
FIG. 2 is an isometric exploded view of the cutting portion of FIG. 1.

Attention is drawn to FIGS. 1 and 2, showing a cutting portion 10 of a cutting tool 12. The cutting tool 12 includes a holder 14 and at least one cutting portion 10 located thereon. Each cutting portion 10 includes an insert pocket 16 and a cutting insert 18 securely clamped thereon, via a clamping member 20. The insert pocket 16 is configured only for clamping cutting inserts. According to this non-limiting example, the clamping member 20 can be a screw.

The insert pocket 16 can include an insert pocket front surface 22 located at a front end 27 thereof, an insert support surface 24 and two support walls 26. The insert support surface 24 can extend rearwardly, from the insert pocket front surface 22 towards the support walls 26. The support walls 26 can extend upwards, from the insert support surface 24 to an insert pocket top surface 28. The insert pocket front surface 22 extends generally downwards from the insert support surface 24. The support walls 26 converge towards an insert pocket rear end 29, away from the insert pocket front surface 22. The support walls 26 converge upwards, in a direction away from the insert support surface 24.

The insert pocket 16 can include a housing 30 which can open out to the insert support surface 24. The housing 30 can also open out to the insert pocket front surface 22. The housing 30 can include a housing wall 32 which extends downwards from the insert support surface 24. The housing 30 can include a housing peripheral surface 34, which extends between the housing wall 32 and the insert pocket front surface 22, generally parallel to the insert support surface 24. The housing peripheral surface 34 can include two head support surfaces 36 which extend along its length. The head support surfaces 36 can have a rail-like shape, and can be formed to provide support against bending of the clamping member 20.

Figure 3:
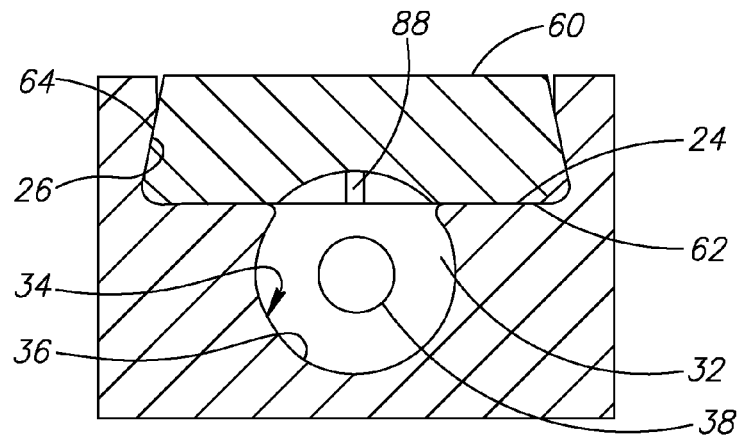
FIG. 3 is a cross-section taken along the line III-III of FIG. 1.
Figure 4:
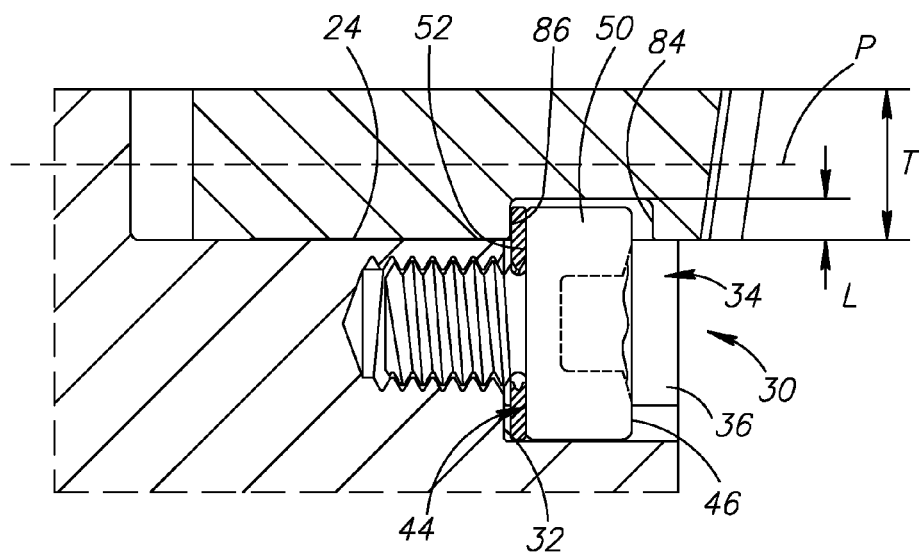
FIG. 4 is a cross-section taken along the line IV-IV of FIG. 1.
Figure 5:
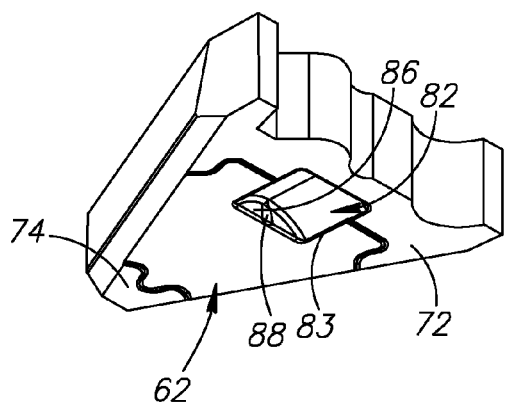
FIG. 5 is a bottom isometric view of the cutting insert of FIG. 1.

Attention is drawn to FIGS. 3 to 5. The housing 30 can include a threaded bore 38 which can open out to the housing wall 32. The bore 38 has a longitudinal bore axis B which can extend generally parallel to the insert support surface 24. The clamping member 20 can be threadingly received in the bore 38. According to this, non-limiting example, the clamping member 20 can have a threaded portion 40 which extends from a head 42. The head 42 includes a head clamping surface 44 which faces the threaded portion 40, and an opposing head abutment surface 46. The clamping member 20 can include a recess which opens out to the head abutment surface 46, and configured for transferring torque, i.e., communicating with a key for tightening the clamping member 20. The head 42 can include a head peripheral surface 48 which extends between the head clamping surface 44 and the head abutment surface 46. The bore 38 is positioned adjacent the insert support surface 24, such that when the clamping member 20 is threaded into the bore 38, an exposed head portion 50 of the head 42, and consequently, an exposed clamping surface 52 of the head clamping surface 44, are raised above, or protrude from, the insert support surface 24. The exposed head portion 50 and the exposed clamping surface 52 are defined with respect to a given angular orientation of the clamping member 20, and not as a specific portion of the head 42, or the head clamping surface 44. The holder 14 can include a washer 54, for reducing wear. The washer is located between the head 42 and the housing wall 32. The washer 54 includes two opposing washer abutment surfaces 56, and may have a washer thread 58, for preventing the washer 54 from moving freely along the clamping member 20, when it is turned.

The cutting insert 18 is typically made of extremely hard and wear-resistant material such as cemented carbide, either by form-pressing or by injection molding and sintering carbide powders in a binder. The cemented carbide may be, for example, tungsten carbide. The cutting insert 18 may be coated or uncoated.

The cutting insert 18 can have a basic triangular shape and has no through holes. The cutting insert 18 includes opposing first and second major surfaces 60, 62 which define a thickness dimension of the cutting insert. The cutting insert 18 includes a mid plane P which is located midway between the major surfaces 60, 62. The mid plane P can be parallel to either one or both major surfaces 60, 62. The cutting insert 18 includes two side surfaces 64 which extend between the major surfaces 60, 62. Each side surface 64 can include one side abutment surface 66. The cutting insert 18 has an insert front end 67 and an insert rear end 69 which define a front-to-rear direction of the cutting insert. The cutting insert 18, at the insert front end 67, includes an insert front surface 68 which extends between the major surfaces 60, 62 and between the side surfaces 64. The side abutment surfaces 66 converge in a direction away from the second major surface 62. The side surfaces 64 converge in a direction away from the insert front surface 68 towards the insert rear end 69. The cutting insert 18 can include an insert rear surface 70 which extends between the side surfaces 64 and between the major surfaces 60, 62. When the cutting insert 18 is seated in the insert pocket 16, the insert rear surface 70 does not contact any portion of the insert pocket 16.

The second major surface 62 can include a front abutment surface 72 located adjacent the insert front surface 68, and a rear abutment surface 74 located adjacent the insert rear end 69 (as shown in FIG. 5). A portion of the first major surface 60 adjacent the insert front surface 68 is configured with rake surface 76. At least a portion of the insert front surface 68 adjacent the first major surface 60 can be configured with a relief surface 78. The first major surface 60 can merge with the front surface 68 and with the side surfaces 64 at an edge, at least a portion of which can include a cutting edge 80. At least a portion of the edge between the first major surface 60 and the front surface 68 can be configured as a cutting edge 80. The rake surface 76 and the relief surface 78 meet at the cutting edge 80.

The cutting insert 18 includes a clamping recess 82 (shown in FIGS. 3, 4 and 5) which opens out to the second major surface 62 and/or to the insert front surface 68. The clamping recess 82 can open out to the second major surface 62 at a non-round opening 83. The clamping recess 82 is located entirely between the second major surface 62 and the mid plane P. In other words, the clamping recess 82 does not extend beyond the mid plane P in the thickness direction of the cutting insert 18. The clamping recess 82 cannot constitute, or function as, a rake surface. It other words, the clamping recess cannot function as a chip conveying surface. In a front view of the cutting insert 18, a cross-section of the clamping recess 82 can have a preferably minimal arched shape (shown in FIG. 3), in order to accommodate the exposed head portion 50 of the head 42. The arched shape is chosen so that the clamping recess 82 can be as small as possible. The clamping recess 82 can have any other shape, suitable for receiving the clamping member 20.

The clamping recess 82 can include a substantially planar insert abutment surface 84, and an opposite, substantially planar insert clamping surface 86. The insert clamping surface 86 generally faces towards the insert front end 67 while the insert abutment surface 84 generally faces towards the insert rear end 69. Thus, in some embodiments, the clamping recess 82 may open out only to the second major surface 62 and not to the insert front surface 68.

The opening 83 can have a substantially rectangular shape, in order to match the shape of the exposed head portion 50 of the clamping member head 42, thereby keeping the volume of the clamping recess 82 to a minimum. In these embodiments, any cross-section of the clamping recess 82 taken along a perpendicular axis to the mid plane P is also rectangular, thus giving the insert clamping and abutment surfaces 84, 86 their planar form.

The insert clamping surface 86 is configured to match the shape of, and engage, the exposed clamping surface 52, or the washer abutment surface 56. The insert clamping surface 86 can include a centered abutment protrusion 88 which protrudes therefrom towards the insert front surface 68. The abutment protrusion 88 can be located centrally in the insert clamping surface 86 in order to assure a centered clamping force applied by the clamping member 20. The insert clamping surface 86 and the insert abutment surface 84 can extend between the second major surface 62 and a closed end of the clamping recess 82. The insert clamping surface 86 is preferably perpendicular to the second major surface 62. The insert abutment surface 84 is preferably perpendicular to the second major surface 62.

A length L of the insert clamping surface 86 is measured between the second major surface 62 and the deepest point of the insert clamping surface 86 in the clamping recess 82, in a general direction perpendicular to the mid plane (P). A maximum thickness T of the cutting insert 18 is measured as the largest distance between the major surfaces 60, 62. According to some embodiments, the length L is in the range of 10% to 45% of the maximum thickness T of the cutting insert 18. The small depth of the clamping recess 82 does not weaken the cutting insert 18 as, for example, a through hole would. Furthermore, the lack of through holes allows for the first major surface 60 to have a homogenous, free of obstacles form, thereby allowing cut chips to flow freely.

In order to clamp the cutting insert 18 in the insert pocket 16, a person operating the cutting tool 12, or operator, can follow these steps: a. Slightly tightening the clamping member 20 in the bore 38. b. Place the cutting insert 18 in the insert pocket 16, on top of the insert support surface 24, while the second major surface 62 faces the insert support surface 24 and the side surfaces 64 are each generally aligned with, or parallel to, each respective support wall 26. In the current position, the insert rear surface 70 faces the insert pocket rear end 29. c. Tighten the clamping member 20, until the exposed head portion 50 is accommodated by, the clamping recess 82, thus allowing the cutting insert 18 to slightly drop downwards inside the insert pocket 16. d. Tighten the clamping member 20 further, until the cutting portion 10 reaches an assembled position. In the assembled position of the cutting portion 10, the cutting insert 18 is securely clamped in the insert pocket 16 of the holder 14. The front and rear abutment surfaces 72, 74 of the second major surface 62 abut the insert support surface 24. Each side abutment surface 66 abuts a respective support wall 26. The clamping member 20 is screw threaded into the bore 38, and the exposed head portion 50 is accommodated by the clamping recess 82. According to embodiments where the holder 14 does not include a washer 54, the head clamping surface 44 abuts the insert clamping surface 86. According to embodiments where the holder 14 includes a washer 54, one washer abutment surface 56 abuts the head clamping surface 44, and the other washer abutment surface 56 abuts the insert clamping surface 86 (see FIG. 5). The head peripheral surface 48 does not necessarily abut the head support surfaces 36.

After the cutting insert 18 has become worn, in order to replace the cutting insert 18, the operator only needs to untighten the clamping member 20 a few turns (without completely removing the clamping member 20 from the bore 38), and the cutting insert 18 should be easy to lift from the insert pocket 16. However, the cutting insert 18 may become stuck, and simply relieving the pressure on the cutting insert 18, may not be enough in order to release it from the friction forces generated with the support walls 26. In order to release the cutting insert 18, the operator may further turn the clamping member 20 until its head abutment surface 46 engages the insert abutment surface 84, and pushes the cutting insert 18 out of the insert pocket 16.

There are at least two advantages to the generally parallel orientation of the clamping member 20 with respect to the major surfaces 60, 62 of the cutting insert 18.

The first is that, in arrangements in which the clamping member 20 is a screw, the amount of clamping force achievable in the elongated direction of the screw, is greater than the amount of eccentric clamping force achieved with generic arrangements, in which the clamping screw is screw threaded in the insert pocket, through the major surfaces of a cutting insert, and perpendicularly thereto.

The second advantage is that the cutting insert does not have a weakening through screw bore. Consequently, the cutting insert can be designed with an obstacle-free first major surface, about which chips can flow freely.

The description above includes exemplary embodiments and details for enablement, if needed, of claimed subject matter, and does not exclude non-exemplified embodiments and details from the claim scope of the present application.

What is claimed is:

1. A cutting insert (18) comprising:
opposing insert front and rear ends (67, 69),
opposing first and second major surfaces (60, 62) and two side surfaces (64) extending therebetween,
two side abutment surfaces (66), each located on a respective side surface (64),
an insert front surface (68) formed at the insert front end (67) and extending between the first and second major surfaces (60, 62) and between the side surfaces (64), and
a clamping recess (82) opening out to the second major surface (62) and/or to the insert front surface (68);
the side abutment surfaces (66) converging towards the first major surface (60), the side surfaces (64) converging in a direction away from the insert front surface (68) and the first major surface (60) merging with the front surface (68) and the side surfaces (64) at an edge, at least a portion of which comprising a cutting edge (80),
wherein
the clamping recess (82) comprises an insert clamping surface (86) which faces towards the insert front end (67), and wherein the clamping recess (82) does not extend beyond a mid plane (P) which is located midway between the first and second surfaces (60, 62), in a thickness direction of the cutting insert.

2. The cutting insert (18) according to claim 1, wherein the clamping recess (82) opens out to the second major surface (62) and/or to the insert front surface (68) at a non-round opening (83).

3. The cutting insert (18) according to claim 1, wherein in a direction perpendicular to the mid plane (P) the insert clamping surface (86) has a length (L) and the cutting insert (18) has a maximum thickness (T); and wherein the length (L) is in the range of 10% to 45% of a maximum thickness (T) of the cutting insert (18).

4. The cutting insert (18) according to claim 1, wherein the cutting insert (18) is devoid of through holes.

5. The cutting insert (18) according to claim 1, wherein the insert clamping surface (86) is perpendicular to the second major surface (62).

6. The cutting insert (18) according to claim 1, wherein the clamping recess (82) comprises an insert abutment surface (84) located opposite the insert clamping surface (86) and facing towards the insert rear end (69).

7. The cutting insert (18) according to claim 6, wherein the clamping recess (82) opens out only to the second major surface (62) and not to the insert front surface (68).

8. A holder (14) comprising:
   an insert pocket (16) comprising:
      an insert pocket front end (27) and an insert pocket rear end (29);
      an insert pocket front surface (22) located at the insert pocket front end (27):
      an insert support surface (24) extending from the insert pocket front surface (22), in a rearward direction, towards the insert pocket rear end (29);
      two support walls (26) extending from the insert support surface (24) to an insert pocket top surface (28), in an upward direction, away from the insert support surface (24), the support walls (26) converging in the upward direction, and in the rearward direction;
      a housing (30) opening out to the insert support surface (24) and to the insert pocket front surface (22), the housing (30) comprising a housing wall (32) extending downwards from the insert support surface (24) and a housing peripheral surface (34) extending from the housing wall (32) to the insert pocket front surface (22); and
      a bore (38) opening out to the housing wall (32), the bore (38) having a longitudinal bore axis (B); and
   a clamping member (20) comprising a head (42) with a head clamping surface (44),
   wherein
   when the clamping member is located in the housing (30), an exposed clamping surface (52) of the head clamping surface (44) protrudes above the insert support surface (24).

9. The holder (14) according to claim 8, wherein the insert pocket (16) is configured only for clamping cutting inserts.

10. The holder (14) according to claim 8, wherein the clamping member (20) is a screw.

11. The holder (14) according to claim 8, wherein the longitudinal bore axis (B) is parallel to the insert support surface (24).

12. The holder (14) according to claim 8, wherein the housing peripheral surface (34) comprises a plurality of rail-shaped head support surfaces (36) which extend along its length.

13. The holder (14) according to claim 8, wherein the holder (14) comprises a washer (54), located between the head (42) and the housing wall (32).

14. The holder (14) according to claim 8, wherein the washer (54) comprises a washer thread (58) and the washer (54) is threadingly secured to the clamping member (20).

15. A cutting tool (12) comprising the holder (14) according to claim 8 and the cutting insert (18) according to claim 1, securely clamped in the insert pocket (16) of the holder (14).

16. The cutting tool (12) according to claim 15, wherein, in an assembled position of the cutting tool (12):
   the second major surface (62) abuts the insert support surface (24);
   each side abutment surface (66) abuts a respective support wall (26);
   an exposed head portion (50) of the head (42) is accommodated by the clamping recess (82); and
   the exposed clamping surface (52) of the head clamping surface (44) abuts the insert clamping surface (86).

17. The cutting tool (12) according to claim 15, wherein, in an assembled position of the cutting tool (12):
   the second major surface (62) abuts the insert support surface (24);
   each side abutment surface (66) abuts a respective support wall (26);
   an exposed head portion (50) of the head (42) is accommodated by the clamping recess (82);
   a washer (54) is mounted on a threaded portion (40) of the clamping member (20); and
   the exposed clamping surface (52) of the head clamping surface (44) abuts the washer (54) which, in turn, abuts the insert clamping surface (86).

18. The cutting tool (12) according to claim 15, wherein when the cutting insert (18) is seated in the insert pocket (16), an insert rear surface (70) of the cutting insert (18) does not contact any portion of the insert pocket (16).

\* \* \* \* \*